US007175185B2

(12) United States Patent
Chen

(10) Patent No.: US 7,175,185 B2
(45) Date of Patent: Feb. 13, 2007

(54) BIT HOLDER

(76) Inventor: Ho-Tien Chen, No. 50-1, Lane 60, Chen-Ping 9 St., Tainan City (TW)

( * ) Notice: Subject to any disclaimer, the term of this patent is extended or adjusted under 35 U.S.C. 154(b) by 23 days.

(21) Appl. No.: 11/057,927

(22) Filed: Feb. 14, 2005

(65) Prior Publication Data

US 2006/0181033 A1 Aug. 17, 2006

(51) Int. Cl.
*B23B 5/22* (2006.01)
*B23B 31/16* (2006.01)

(52) U.S. Cl. .................................................... 279/75

(58) Field of Classification Search ................ 408/110, 408/112, 113, 202, 241 S; 279/75; 81/429
See application file for complete search history.

(56) References Cited

U.S. PATENT DOCUMENTS 3,767,218 A * 10/1973 Linthicum et al. ............ 279/75
4,287,923 A 9/1981 Hornung ...................... 81/429
4,753,142 A 6/1988 Hornüng ...................... 81/429
5,996,452 A * 12/1999 Chiang ........................ 81/429
6,325,393 B1 * 12/2001 Chen et al. .................. 279/22
6,530,299 B1 * 3/2003 Liu ............................ 81/451
6,722,667 B2 * 4/2004 Cantlon ...................... 279/22
6,935,637 B2 * 8/2005 Cantlon ...................... 279/75
6,953,196 B1 * 10/2005 Huang ........................ 279/75

* cited by examiner

*Primary Examiner*—Willmon Fridie, Jr.
(74) *Attorney, Agent, or Firm*—J.C. Patents

(57) ABSTRACT

A bit holder comprises a shank, a sleeve placed over the shank, and an adjusting sleeve coupled to the sleeve. The shank has a combination part for incorporating with a hand tool, a C-shaped retaining groove for engaging with a C-shaped buckle, and a combination groove for holding a bit. The sleeve has an inner ring with a gap for assorting with a locking bulge on the shank and a position bead hole on its outer threading for accommodating a position bead. The adjusting sleeve with an inner threading for locking the outer threading of the sleeve has a long groove on its inner wall and, by using this long concaved groove to assort with the position bead, the locking position between the adjusting sleeve and the sleeve can be adjusted.

8 Claims, 8 Drawing Sheets

BIT HOLDER

FIELD OF THE PRESENT INVENTION

The present invention provides a bit holder, which particularly can incorporate with a variety of locking depth of various screws, adjust the extension length of screwdriver freely, and use the buckling bead designed on the shank to fix and replace the bit faster and more conveniently; additionally, it can release locking twisting force of bit after the completion of screw's locking.

BACKGROUND OF THE PRESENT INVENTION

According to the popular bit holders (as shown in FIG. 1–3), such as those disclosed in U.S. Pat. No. 4,287,923 and 4,753,142, a conventional bit holder includes: a shank 1, on which a combination part 10 that can incorporate with hand tools was designed; and a C-shaped retaining groove 11 which would be buckled by a C-shaped buckle 110. And a reversion locking bulge 12 was provided. If necessary, just pressing the internal and external sleeve 15, 16 backwards would make the bit keep its extended position (see FIG. 3), and the screw held by the bit can be pulled out. Additionally, a plural locking bead holes 13 were designed for buckling round bead 130, and a combination groove 14, in which a flexible retaining groove 140 which would be buckled by a flexible buckle 141, was designed, and the flexible buckle 141 would be buckled within concaved pentagonal cover 170 of the bit 17 and combine the bit 17 with shank 1. In addition, an external sleeve 15 was designed to have a perforation 150 through which the shank 1 and a spring 151 and go; and an internal sleeve 16, whose rear holds one end of the spring 151, is equipped with a ring concaved groove 160, the ring concaved groove 160 can work with the action of the buckling round bead 130 and release the twisting force of bit timely (see FIG. 2).

However, because the extension length of bit cannot be adjusted as required when lock screw is up to a certain depth as shown in FIG. 1, the conventional bit holder cannot meet the locking requirement of various screws, for example, the pan screw's long head remained on the parts results in bad locking. Additionally, the bit 17 is fixed on the combination groove 14 of shank 1 with the flexible buckle 141 that can fix the bit well, but is hard to replace, and generally, a pincers is required for clipping it, which brings inconvenience to the user. For this purpose, the present invention can overcome the locking defects of the conventional bit holders and bring convenience to the user so as to meet the important requirement of innovation.

SUMMARY OF THE PRESENT INVENTION

The purpose of the present invention is to provide a bit holder which can work with a variety of locking depth of various screws and adjust the extension length of the bit freely; wherein a buckling bead was designed on the shank for fixing the bit and providing the user with convenient replacement; additionally, it can release locking twisting force of bit after the completion of screw's locking timely. The present invention was designed to fix the bit with sleeve to limit and fix the buckling bead located on the combination groove.

In the bit holder, an outer threading was designed on the sleeve, locking the adjusting sleeve. And a position bead hole was designed for position bead. Adjusting the operational state of the long concaved groove of the inner wall of position bead and adjusting sleeve can change the locking position of the adjusting sleeve and the sleeve. It can change the extension length of the bit and work with a variety of locking depth of various screws and release timely locking twisting force of bit after the completion of screw's locking.

DESCRIPTION OF THE EMBODIMENTS

Figure 1:
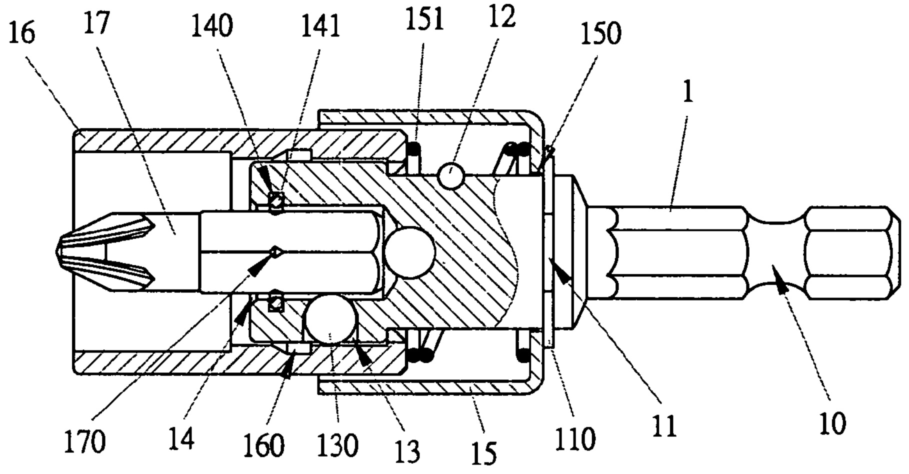
FIG 1 (PRIOR ART)
FIG. 1 is a cutaway view of a conventional bit holder.
Figure 2:
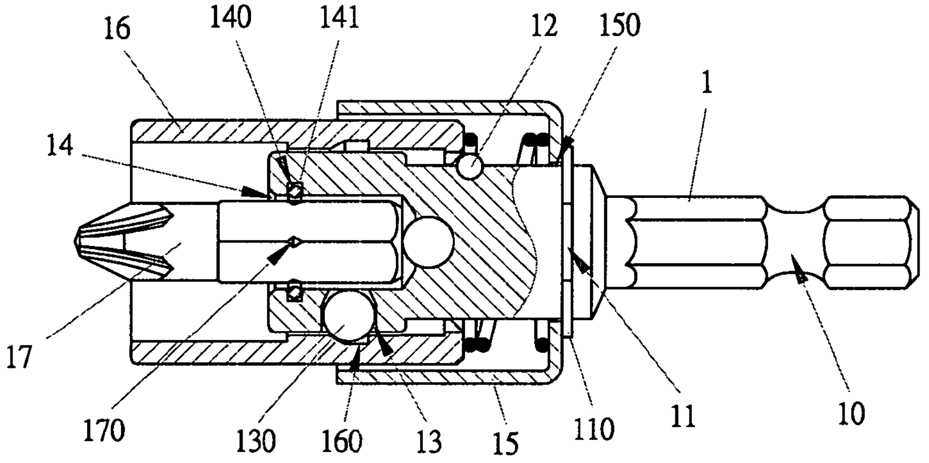
FIG 2 (PRIOR ART)
FIG. 2 is a cutaway view when the conventional bit holder locks a screw.
Figure 3:
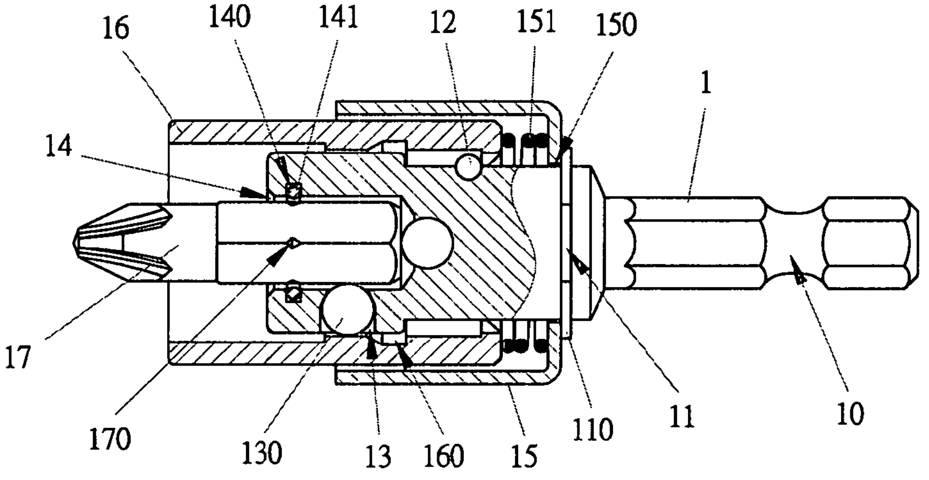
FIG 3 (PRIOR ART)
FIG. 3 is a cutaway view when the conventional bit holder locks a screw reversely.
Figure 4:
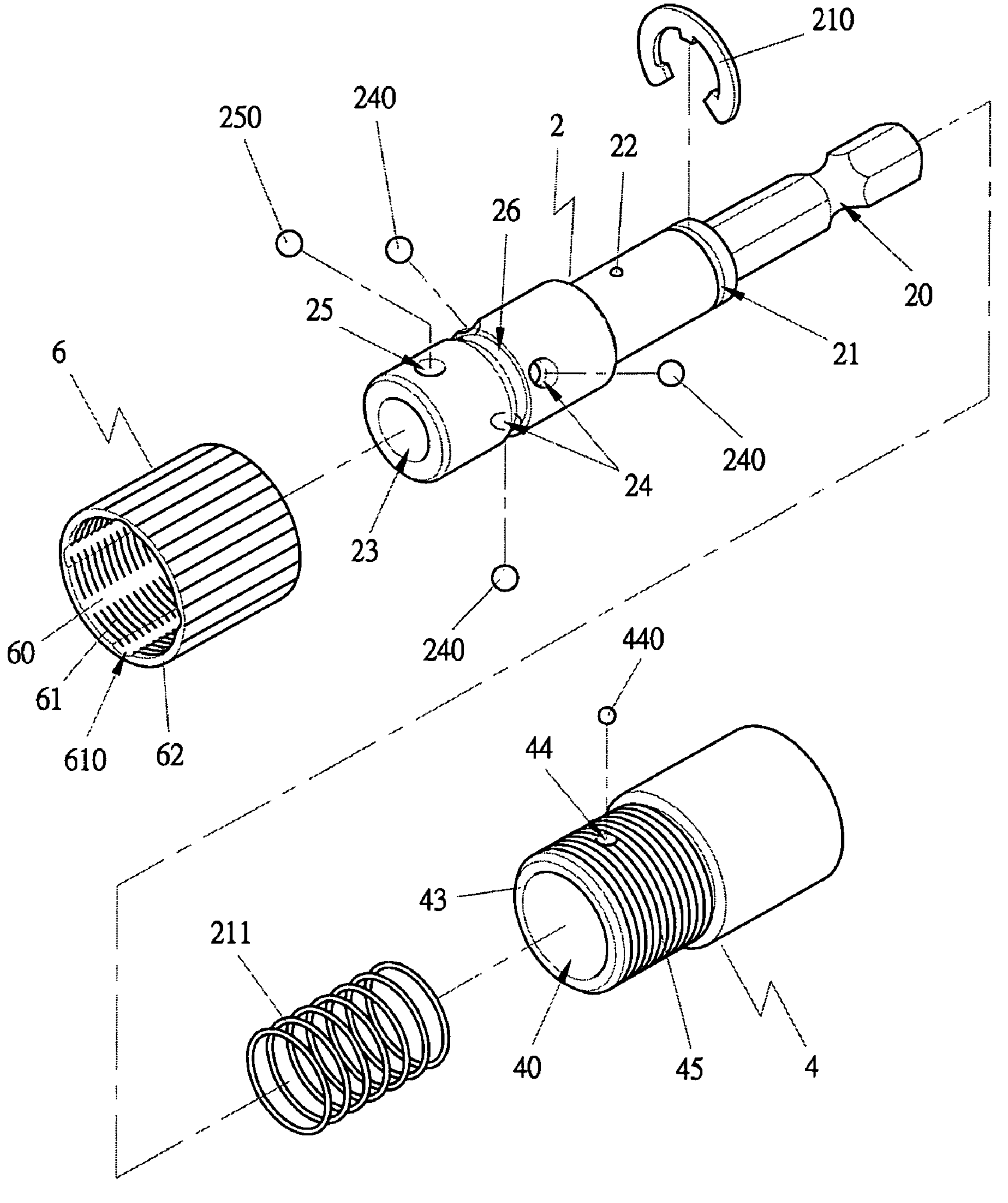
FIG. 4 is a disassembly view of Embodiment 1 of the present invention.
Figure 5:
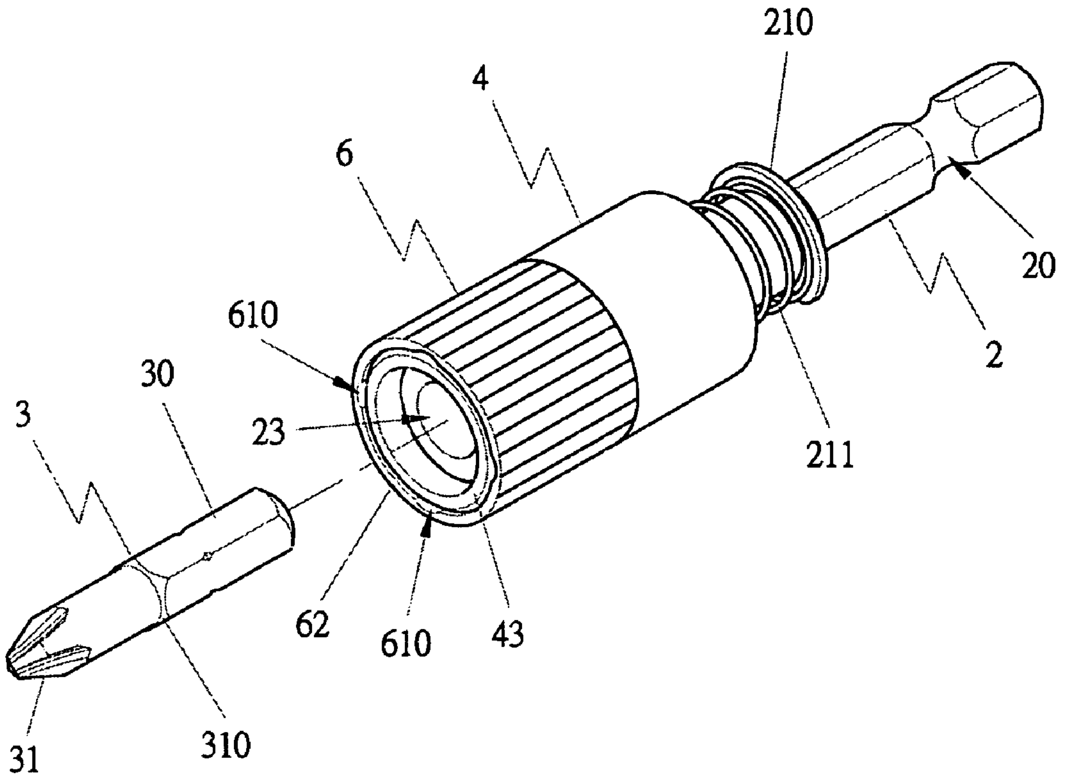
FIG. 5 is a partial disassembly view of the bit holder of the present invention.
Figure 6:
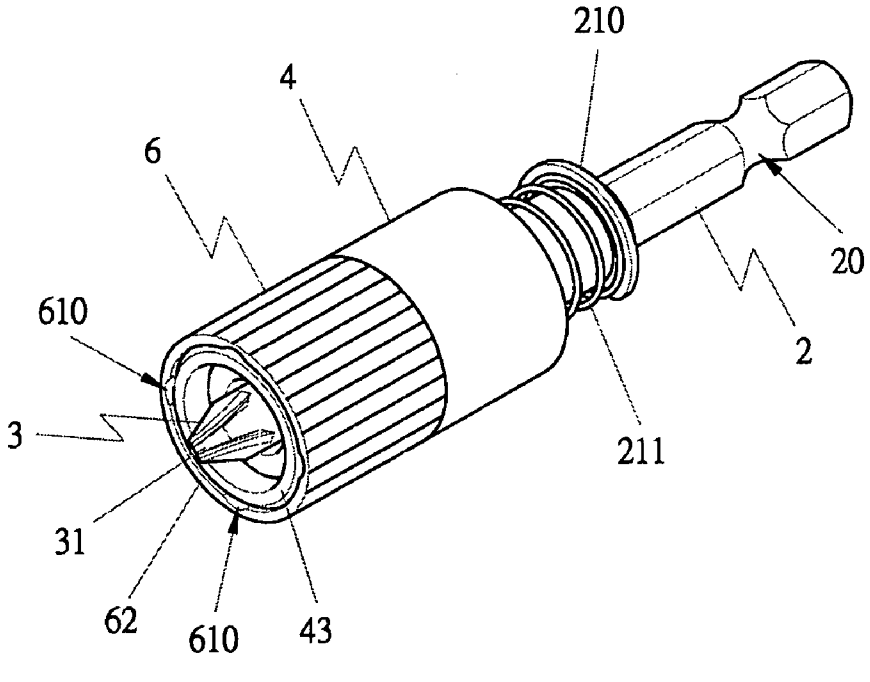
FIG. 6 is an assembly view of the bit holder of the present invention.
Figure 7:
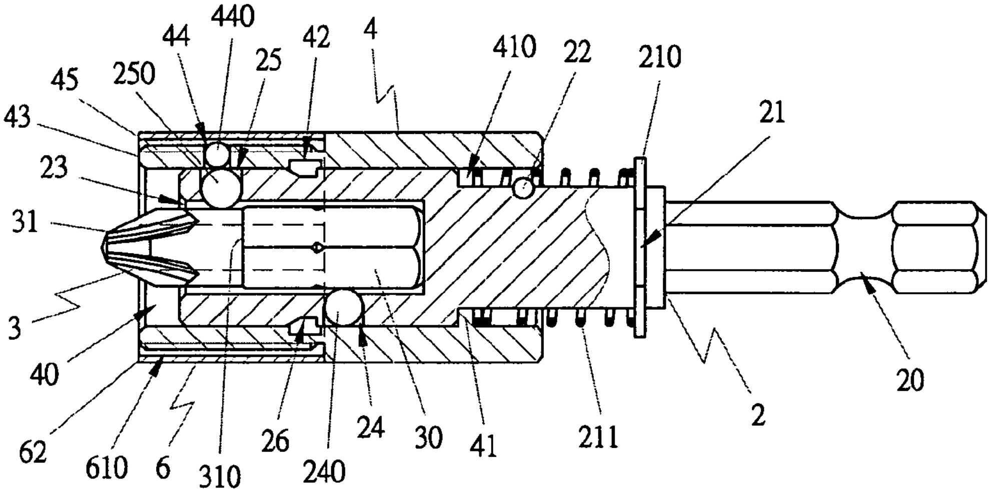
FIG. 7 is a cutaway view of locking depth of the bit holder of the present invention.
Figure 8:
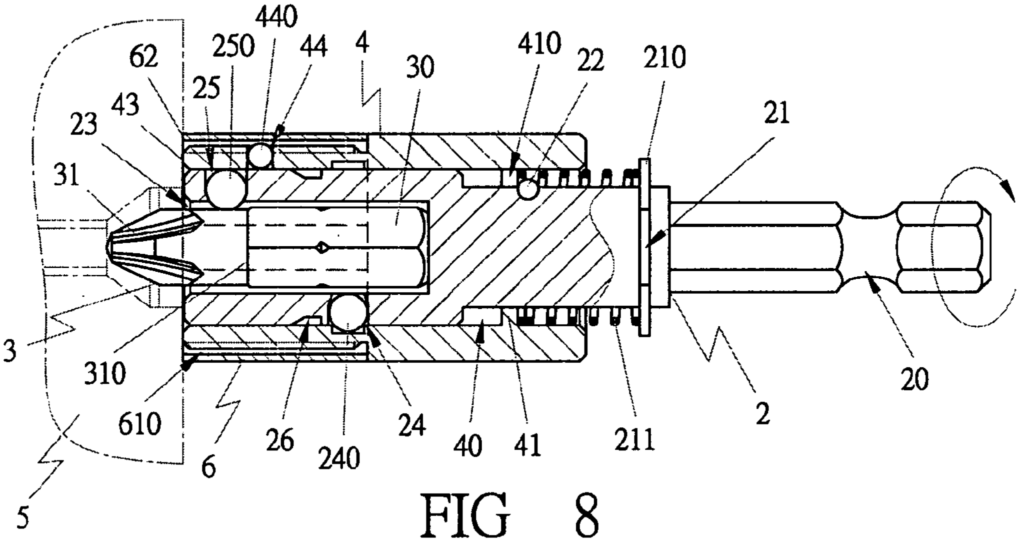
FIG. 8 is a cutaway view of the locking screw of the present invention.
Figure 9:
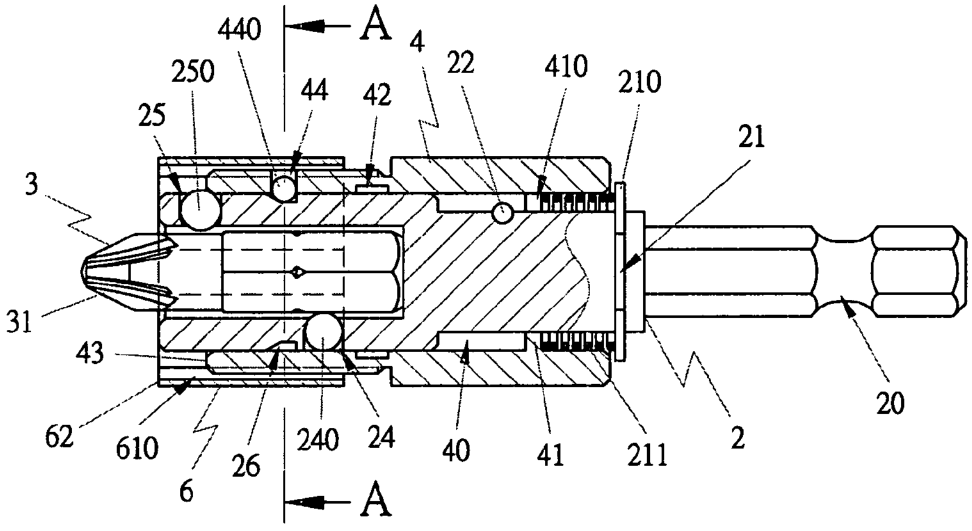
FIG. 9 is a cutaway view of the adjusting locking depth of the present invention.
Figure 10:
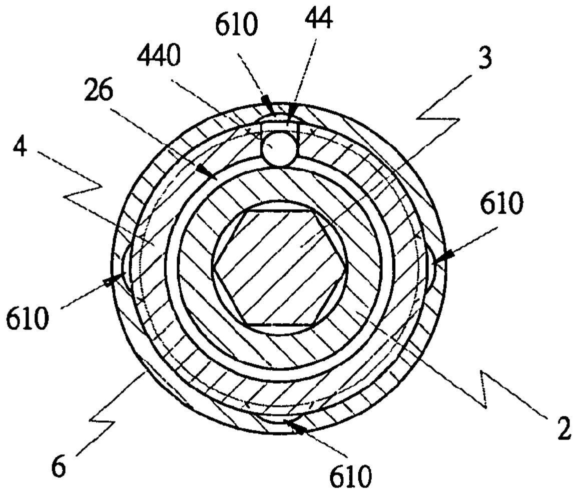
FIG. 10 is a cross sectional view along A—A of FIG. 9.
Figure 11:
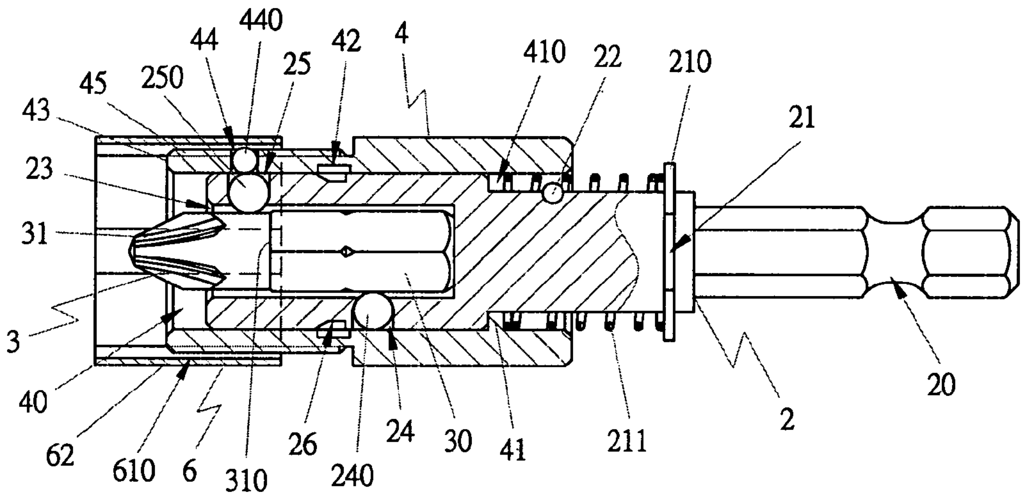
FIG. 11 is a cutaway view after adjusting locking depth of the present invention.
Figure 14:
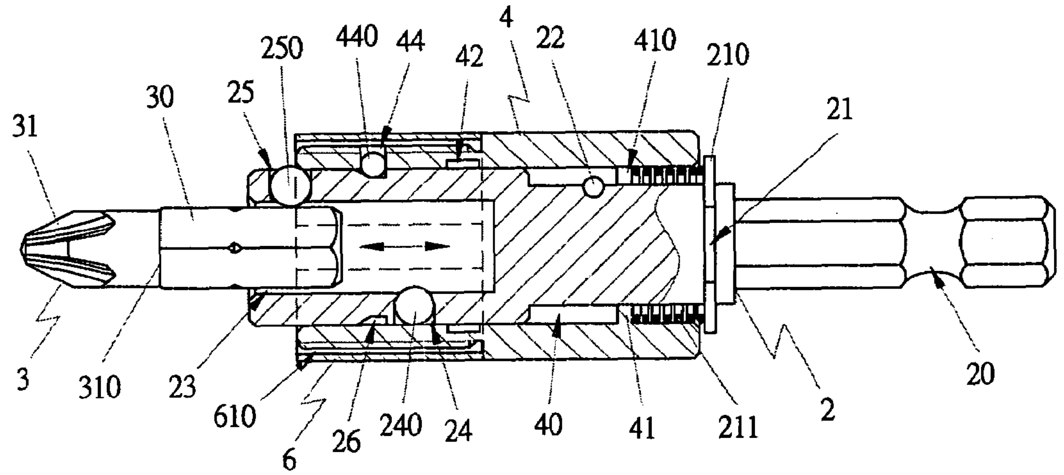
FIG. 14 is a cutaway view while replacing the bit.
Figure 15:
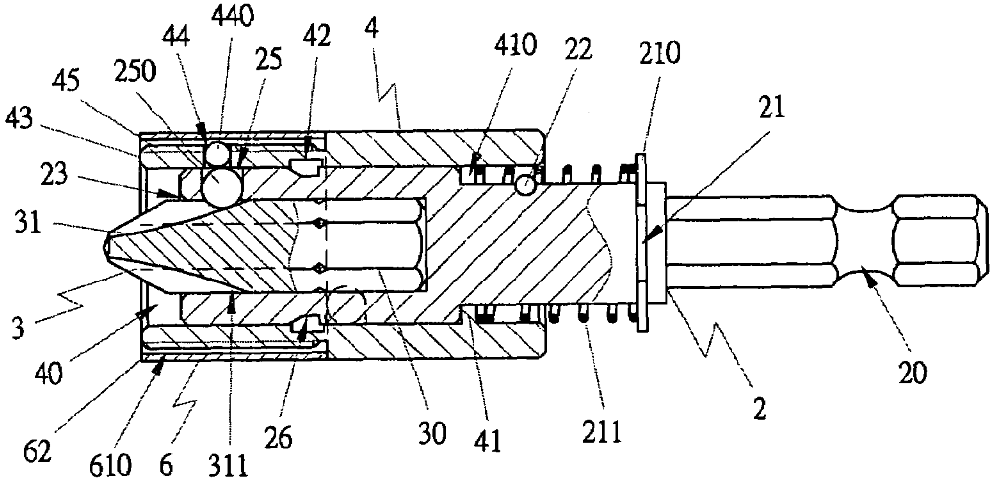
FIG. 15 is a cutaway view while the bit holder of the present invention combines with another kind of bit.

Thus, for better understanding of the present invention, some explanation on drawings is given as follows:

As shown in FIGS. 4–8, the present invention provides a bit holder which contains a shank 2 on which a combination part 20 was designed and the combination part 20 can incorporate with hand tools. A C-shaped retaining groove 21 was set on shank 2 particularly for a C-shaped buckle 210, and a spring 211 was designed on one side of C-shaped buckle 210 (as shown in FIGS. 7–9). The C-shaped buckle 210 would be used to hold one end of the spring 211 for limiting back distance of a sleeve 4; additionally, a reversion locking bulge 22 was set to make the bit keep its maximal extension length (see FIG. 15) by pressing aftermentioned sleeve backwards to pull out the screw in some parts; and a combination groove 23 was designed for screwdriver 3, and a plural locking bead holes 24 were designed on the combination groove 23 for setting a locking bead 240 which can fasten the shank 30 of bit 3 (see FIGS. 7–9) to integrate the bit 3 with shank 2 for driving; a buckling bead hole 25 was designed for buckling bead 250 which can buckle the lower ring 310 of the edge part 31 of the bit 3 (see FIG. 7), or can fasten the edge groove end 311 of edge part 31 of the bit 3 (see FIG. 15) for positioning the bit 3 in the combination groove 23. Just by pressing the sleeve 4 backwards and making the buckling bead 250 loosen the lower ring 310 (see FIG. 14) or the edge groove end 311 of the edge part 31 of the bit 3 (see FIG. 15) to replace the bit 3, the bit will separate from the combination groove 23, and the user will only need to take the bit holder of the present invention inversely to pour the bit 3 out of the combination groove 23 fast and conveniently. It can overcome the defect that the user must use a pincers to clip it out as described above. Additionally, a concaved ring 26 was designed for working with the operation of the position bead 440 of adjusting sleeve 6 for adjusting the locking depth of the screw (see FIG. 9–11).

Figure 12:
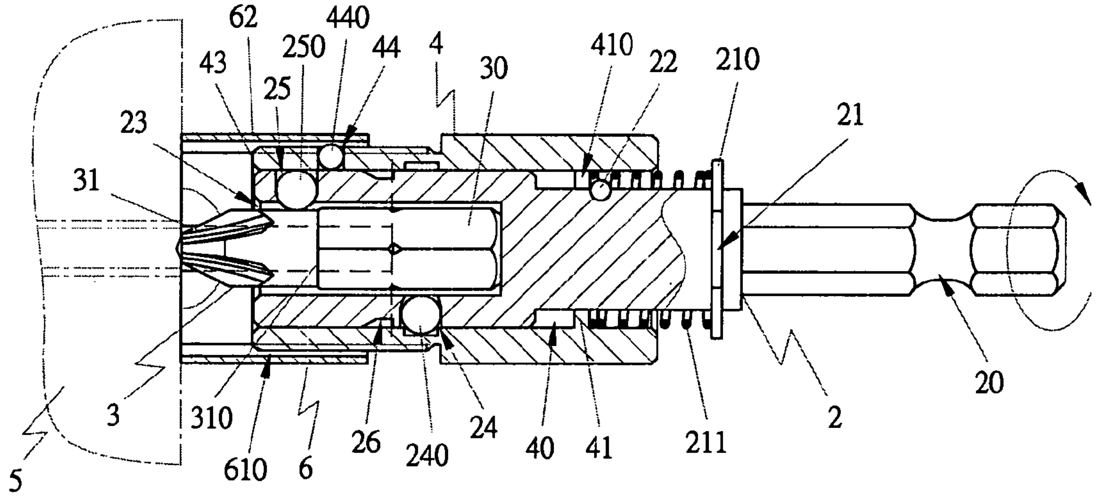
FIG. 12 is a cutaway view of the locking screw after adjusting locking depth of the present invention.
Figure 13:
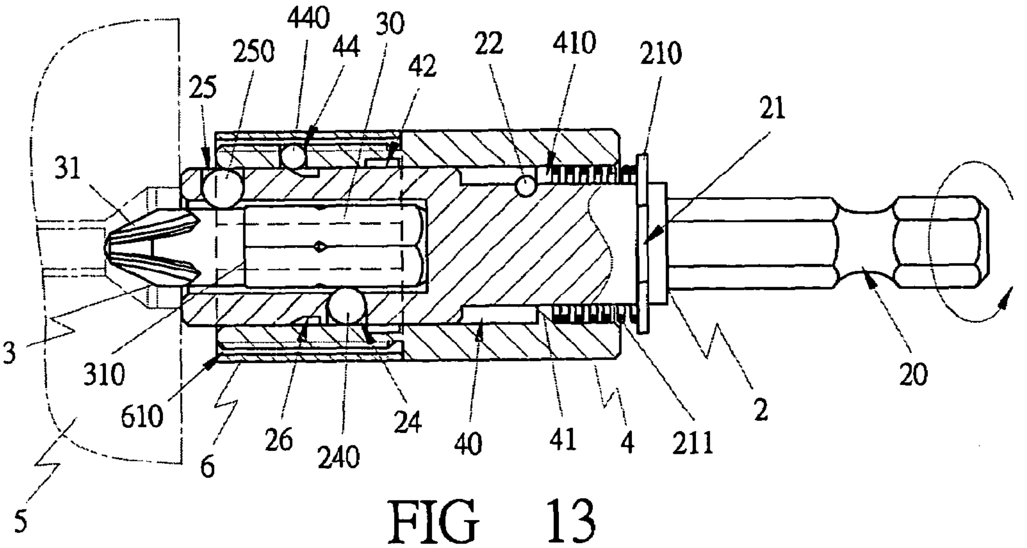
FIG. 13 is a cutaway view of reversion of the present invention.

The sleeve 4 has a through hole 40 designed for receiving the shank 2, and at the rear of the inner wall of the sleeve 4 was designed an inner ring 41 which can hold another end of spring 211 set on the shank 2, and a gap 410 was designed in the inner ring 41 to work with the operation of locking bulge 22 of the shank 2 (see FIGS. 7–9). When pushing the sleeve 4 back to move the locking bulge 22 to the left side of the inner ring 41 via the gap 410 (see FIG. 14), the bit 3 will extend to its maximum. It would be good for the combination of the screw to lock the parts deeply, and then turn over the screw with hand tool and take out the screw. And a concaved groove 42 was set near the front of the inner wall of the sleeve 4, which can work with the operation of the locking bead 240. When the bit 3 locks the screw to the specified depth, the front edge 43 of the sleeve 4 and the front 62 of the sleeve 6 will be in touch with the part 5 (see FIG. 8), or the user can change the distance between the sleeve 4 and the sleeve 6 (see FIG. 9, 11 and 12) by moving the sleeve 4 back. The less thread the adjusting sleeve 6 locks the longer distance between the front edge 43 of sleeve 4 and the front 62 of sleeve 6 is. That will make the locking bead 240 enter the concaved groove 42 of sleeve 4 and the locking bead 240 will loosen the shank 30 of the bit 3 (see FIG. 8 and 12) to make the bit 3 stop and the shank 30 idle. And when the screw was locked to proper depth, the twisting force of bit 3 will be released to avoid the screw's continuous screwing into part 5, exceeding the specified depth. An outer threading 45 was designed on the sleeve 4, which can adjust the lock of sleeve 6 and has a position bead hole 44 for position bead 440.

Inner threading 60 was designed on the adjusting sleeve 6 which can be used for locking the outer threading 45 of the sleeve 4; and on the inner wall 61 of the adjusting sleeve 6 one or more long concaved glove 610 is set. The present invention contains four parts with the purpose of use this long concaved groove to incorporate with the operation of position bead 440 of the sleeve 4. In order to adjust the locking depth of the screw, the extension length of the bit 3 and the locking position of the adjusting sleeve 6 and the sleeve 4 should be adjusted, so that the extension length of the bit can be changed (see FIG. 7 and 12). At this time, because the position bead 440 was designed in the long concaved groove 610 of the adjusting sleeve 6, the adjusting sleeve 6 and sleeve 4 could be combined fully. Therefore, the adjusting sleeve 6 and the sleeve 4 should be pushed backwards, making the position bead 440 fall into the concaved ring 26 of the shank 2 (see FIG. 9), and the position bead 440 will be separated from the long concaved groove 610 and the adjusting sleeve 6 will be driven. After rotating to the specified position, the sleeve 4 and the adjusting sleeve 6 are loosened and pushed forwards to the specified position by means of the force of the spring 211.

Figure 16:
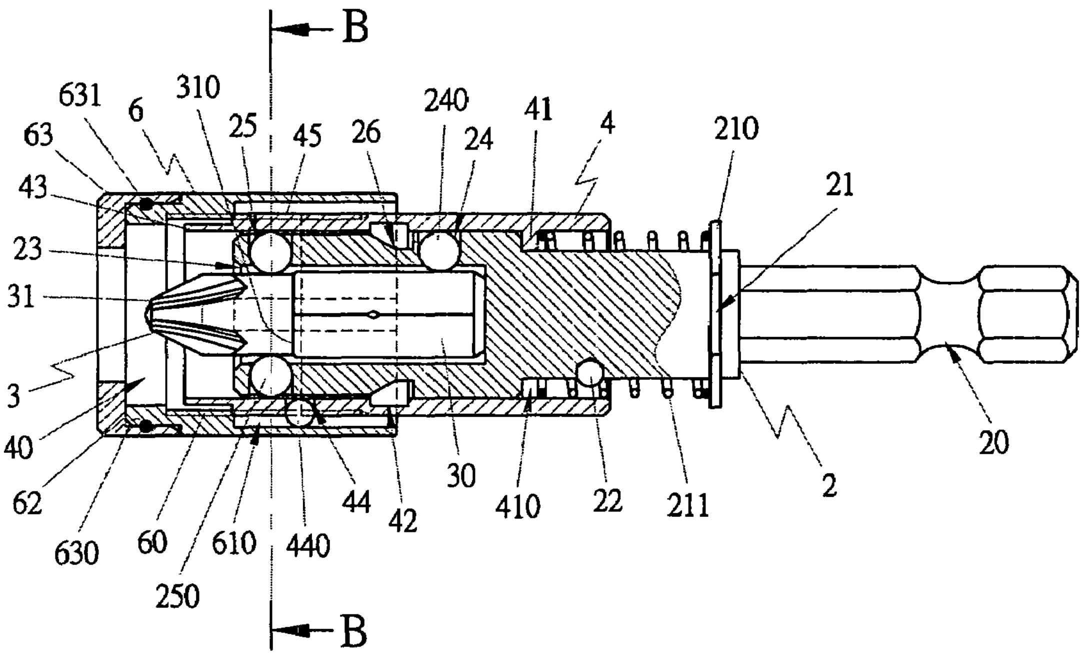
FIG. 16 is a cutaway view of the auxiliary sleeve of Embodiment 2 of the present invention.
Figure 17:
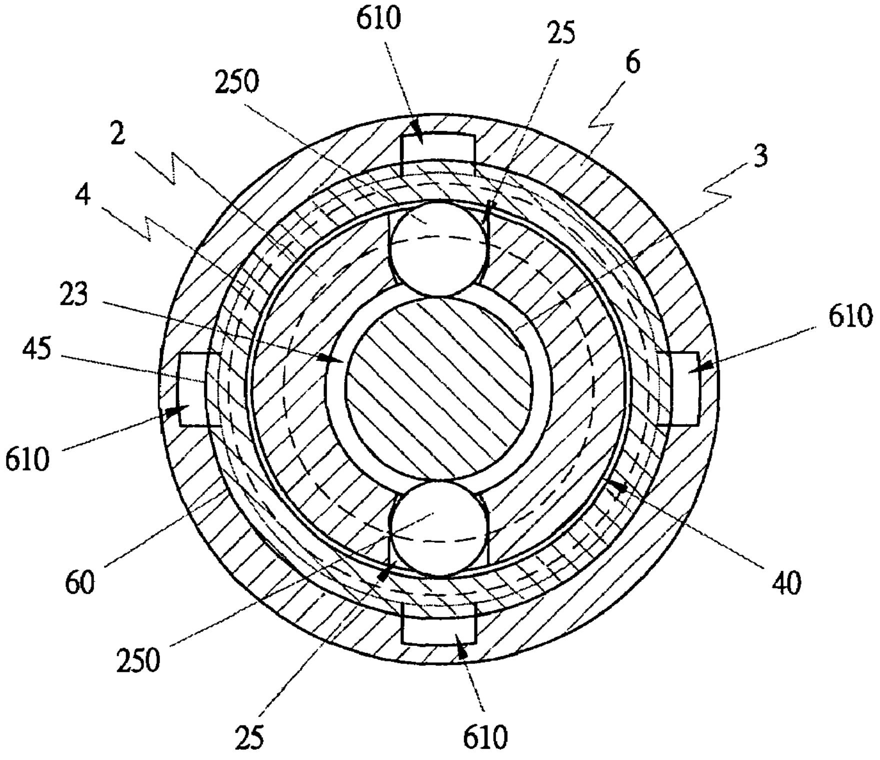
FIG. 17 is a cross section view of FIG. 16.
Figure 18:
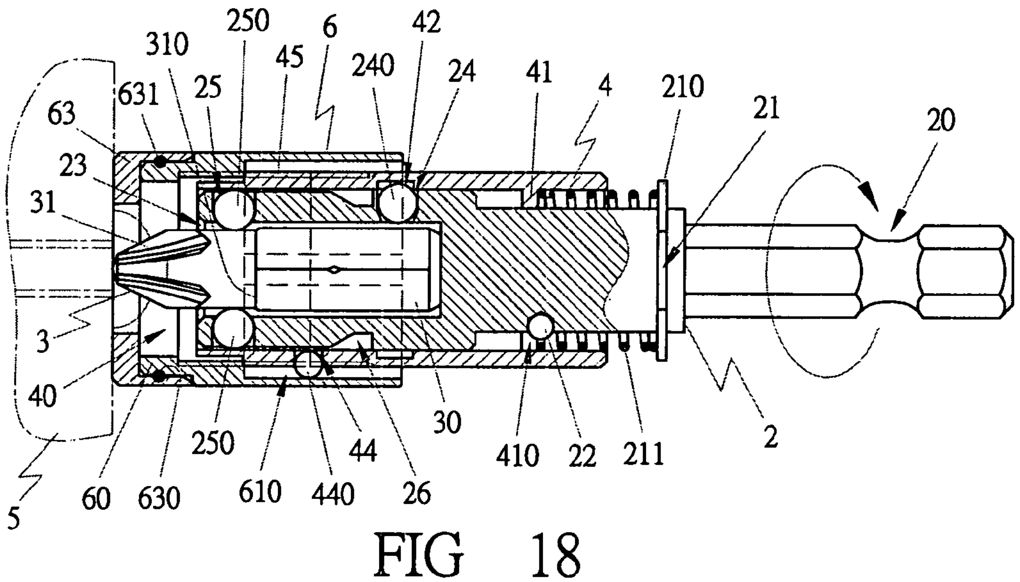
FIG. 18 is a cutaway view of contact surface of the Embodiment 2 of the present invention.
Figure 19:
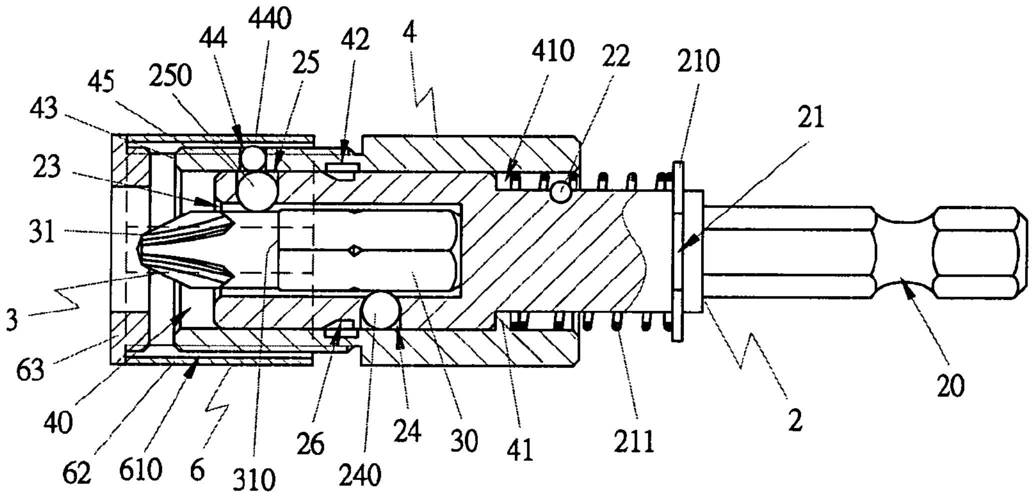
FIG. 19 is a cutaway view of the auxiliary sleeve of Embodiment 3 of the present invention.
Figure 20:
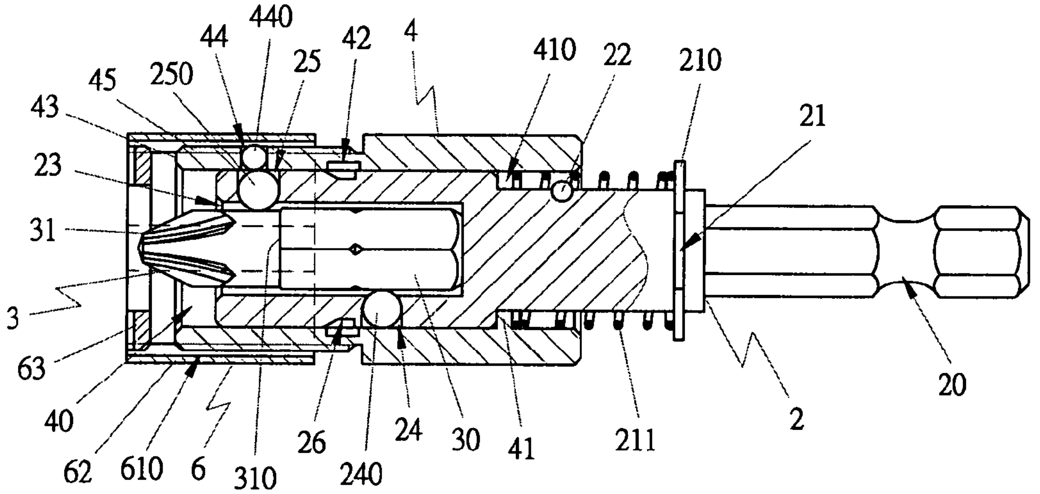
FIG. 20 is a cutaway view of the auxiliary sleeve of Embodiment 4 of the present invention.

After the screw is locked into the specified depth, to protect the surface of part 5 from the damage caused by the friction from the front edge 62 of the adjusting sleeve 6, an auxiliary sleeve 63 was designed at the front of the adjusting sleeve 6, as shown in FIGS. 16–20, as the Embodiment 2 of the present invention, in which a C-shaped retaining groove 630 was set on the adjusting sleeve 6, and a C-shaped buckle 631 can cover it; and the auxiliary sleeve 63 is screwed into the outer side of the front edge of the aforesaid adjusting sleeve 6 (as shown in FIG. 16). Additionally, as shown in Embodiment 2, when the locking screw is locked to the specified depth (see FIG. 18), the front of auxiliary sleeve 63 reaches the front surface of the part 5 and causes all sleeves back to release the twisting force of the bit 3 and makes the bit 3 race (same as the function in FIG. 8), so that the retaining groove of the screw would not be damaged by the friction with the bit. However, at this time, the shank 2 would turn continually if the hand tool is still at ON state. Because friction exits between the position bead 440 and sleeve 4 and the spring 211 would act on the sleeve 4 and shank 2 to drive sleeve 4, and the sleeve 6 also would be driven by the sleeve 4. To avoid the slippage produced between the front edge 62 and surface of part 5 for the driving of adjusting sleeve 6, and to avoid to wear or damage the surface, the function of C-shaped buckle 631 set between the adjusting sleeve 6 and auxiliary sleeve 63 is required. However, because the front of the auxiliary sleeve 63 has touched the surface of part 5, even the adjusting sleeve 6 was driven, only the C-shaped buckle 631 can revolve, and the auxiliary sleeve 63 cannot revolve simultaneously, so that the surface of the part 5 can be prevented from damage.

The auxiliary sleeve 63 was designed for the circumstance when the adjusting sleeve 6 was extended to a certain length beyond its maximum, which can be locked with the adjusting sleeve 6 and fixed on the front of adjusting sleeve 6, that would make the user fail to see the correct position of the bit and meet the screw with it easily. Therefore, by adjusting and narrowing the inside diameter of the adjusting sleeve to be close to that of the screw head with auxiliary sleeve 63, the user will directly known the present position of the bit and meet the screw head with it fast for locking. So other than in the embodiment 2, it is practicable, as shown in Embodiments 3 and 4, to screw the aforesaid auxiliary sleeve 63 into the inner side of the front of the adjusting sleeve 6 while the auxiliary sleeve 63 in the Embodiment 4 into the outer side of the front of the abovementioned sleeve 6 for achieving double functions of the auxiliary sleeve designed.

Thus, the present invention not only can incorporate with the locking of various screws, but also can release the locking torsional force of the bit after the locking according to the required locking depth of adjusting screw; additionally, the present invention can extend the service life of a bit. For its small volume, it can incorporate with any had tool and will not increase the user's burden.

What is claimed is:

1. A bit holder comprising:

a shank, on which a combination part and a C-shaped retaining groove are formed, a C-shaped buckle for engaging with the C-shaped retaining groove, one side of the C-shaped buckle receiving a spring, a locking bulge provided on the shank, and a combination groove formed at one end of the shank for holding a bit one or more locking bead holes and one or more buckling bead holes being formed on the shank; and a sleeve for coupling the shank, the sleeve having an inner ring formed on an inner wall thereof which can hold one end of the spring and has a gap for assorting with the locking bulge, a concaved groove set on the inner wall of the sleeve for engaging with a locking bead received by the locking bead hole, an outer threading, and a position bead hole on the outer threading for accommodating a position bead; and an adjusting with an inner threading for locking the outer threading of the sleeve, a long concaved groove designed on an inner wall of the adjusting sleeve, wherein, using this long concaved groove to assort with the position bead, the locking position of the adjusting sleeve and the sleeve can be adjusted.

2. The bit holder as recited in claim 1, wherein a buckling bead is received by the buckling bead hole of the sleeve for buckling an edge groove end of an edge part of the bit.

3. The bit holder as recited in claim 1, wherein a concaved ring is designed on the shank for engaging with the position bead and adjusting the locking position between the adjusting sleeve and the sleeve.

4. The bit holder as recited in claim 1, wherein only one said long concaved groove is formed on the adjusting sleeve.

5. The bit holder as recited in claim 1, wherein more than one said long concaved groove are formed on the adjusting sleeve.

6. The bit holder as recited in claim 1, further comprising an auxiliary sleeve.

7. The bit holder as recited in claim 6, wherein a C-shaped retaining groove is formed on the adjusting sleeve in a connection area between said auxiliary sleeve and the adjusting sleeve, and a C-shaped buckle is engaged with the C-shaped retaining groove.

8. A bit holder comprising:

a shank, on which a combination part for incorporating with a hand tool, a C-shaped retaining groove for engaging with a C-shaped buckle, and a bulge are formed; a combination groove being formed at one end of the shank for holding a bit; one or more locking bead holes and one or more buckling bead holes being formed on a sidewall of the combination groove; and a sleeve for coupling the shank, the sleeve having an inner ring formed on an inner wall thereof which can hold one end of a spring and has a gap for assorting with the locking bulge, an outer threading, and a position bead hole on the outer threading for accommodating a position bead; and an adjusting sleeve with an inner threading for locking the outer threading of the sleeve, a long concaved groove designed on an inner wall of the adjusting sleeve, wherein, using this long concaved groove to assort with the position bead, the locking position of the adjusting sleeve and the sleeve can be adjusted.

* * * * *